United States Patent Office 3,370,044
Patented Feb. 20, 1968

3,370,044
DYEABLE POLYURETHANES AND POLYAMIDES CONTAINING PIPERAZINE-BASED MODIFIERS IN THE POLYMER CHAIN
Ralph Gardner Beaman, Boothwyn, Pa., assignor to E. I. du Pont de Nemours and Company, Wilmington, Del., a corporation of Delaware
No Drawing. Continuation-in-part of application Ser. No. 459,452, May 27, 1965, which is a continuation-in-part of application Ser. No. 28,545, May 12, 1960. This application Nov. 10, 1966, Ser. No. 593,323
17 Claims. (Cl. 260—77.5)

ABSTRACT OF THE DISCLOSURE

Linear fiber-forming polycarbonamides and polyurethanes of improved acid dyeability which have improved resistance to heat or light discoloration are provided by the said polymers containing as an integral part of the polymer chain from 0.2 to about 15.0 mole percent of a piperazine-based modifier, e.g.

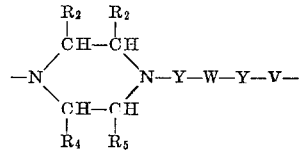

This application is a continuation-in-part of United States application S.N. 459,452 filed May 27, 1965, now abandoned, which in turn is a continuation-in-part of United States application S.N. 28,545 filed May 12, 1960, now abandoned.

This invention relates to a modified polyamide and polyurethane. More particularly, it relates to shaped structures of modified polyamides and polyurethanes which exhibit high acid dye sensitivity and improved stability against the action of bleaching agents.

An important improvement in the dyeability of polyamides and polyurethanes by acid dyes was made by the introduction of certain piperazine derivatives, such as N,N'-bis(aminopentyl)piperazine, as modifiers. These modifiers, while effective in improving the acid-dye sensitivity of shaped structures of polyamides and polyurethanes, make these polymers sensitive to bleaching agents. When treatment with a bleaching agent is followed by exposure to heat or light, the modified polymers show a discoloration called heat-yellowing. It would be highly desirable if a modifier could be provided which improves the acid-dye sensitivity of polycarbonamides and polyurethanes, but which eliminates substantially objectionable discoloration from use of bleaching agents.

The present invention provides a composition of matter comprising a linear, synthetic, fiber-forming polymer selected from the group consisting of polycarbonamides and polyurethanes containing as an integral part of the main polymer chain between about 0.2 and about 15.0 mole percent of recurring units of the formula

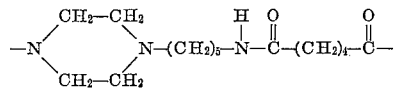

wherein —Y— is alkylene containing no more than about 14 carbon atoms, —W— is selected from the group consisting of

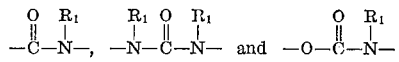

—V— is selected from the group consisting of

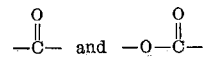

with the proviso that —V— be joined to —Y— in such a manner that

terminates the formula of the repeating unit, and $R_1$, $R_2$, $R_3$, $R_4$, and $R_5$ are selected from the group consisting of hydrogen and alkyl containing no more than about four carbon atoms.

Inherent viscosity as used herein is calculated from the formula $$I_I = \frac{\ln I_R}{C}$$

wherein $I_I$ is the inherent viscosity, $I_R$ the relative viscosity and C the concentration of 0.5 gram polymer per 100 cc. of solution in the indicated solvent at 25° C.

In the following examples all parts and percentages are by weight unless otherwise indicated. Dye bath component composition is based on the weight of the fabric dyed.

EXAMPLE I

A charge of 688 parts of anhydrous piperazine, 470 parts of chlorovaleronitrile, 464 parts of sodium carbonate, 1200 parts of water, and 4 parts of potassium iodide, as catalyst, are heated at reflux with stirring for 5 hours. Upon cooling to room temperature, the reaction mixture is filtered to remove sodium bicarbonate formed in the reaction as a by-product. To the filtrate are added 200 parts of sodium hydroxide to salt out the desired reaction product. The mixture is filtered and the precipitate extracted with benzene and the benzene extract dried and distilled under reduced pressure. The product, N-cyanobutylpiperazine, is collected as the fraction distilling between 100 and 108° C. at 0.2 mm. pressure.

The N-cyanobutylpiperazine, in an amount of 355 parts, is mixed with 100 parts of liquid ammonia, 80 parts of methanol and 50 parts of Raney cobalt catalyst, and hydrogenated at 135° C. and about 1800 lbs./inch² pressure for 3 hours. Upon removal of the catalyst by filtration, the product, N-aminopentylpiperazine, having a boiling point of 158° C. at 24 mm. is distilled under reduced pressure.

The adipic acid salt of N-aminopentylpiperazine is prepared by adding a solution of 89 parts of N-aminopentylpiperazine in 100 parts absolute ethanol to a solution of 73 parts of adipic acid in 250 parts absolute ethanol. After cooling, the salt is collected by filtration, washed once with cold alcohol and several times with dry ether and dried with air.

A stainless steel autoclave is purged of air, filled with nitrogen and charged with 5300 parts of an aqueous solution containing 49.50% hexamethylene diammonium adipate, 63.4 parts of the salt prepared as above, 12.7 parts of sodium 2,5-dimethylphenylphosphinate and 3.0 parts of glacial acetic acid. The autoclave is heated until its temperature is 195° C. at 250 p.s.i. pressure. Then 34 parts of an aqueous slurry containing 25% titanium dioxide are added (0.3% $TiO_2$ based on the weight of polymer). The heating is continued until at 242° C. and bleeding off of water vapor is begun. The polymer polymerization cycle is continued as in Example 1 of U.S. Patent 2,163,636. Upon completion of the polymerization reaction, the molten polymer has a relative viscosity of 24.0. The polymer is extruded in the form of a ribbon upon a casting wheel. After quenching, it is cut into chips suitable for remelting at the grid of a spinning assembly. The modified poly(hexamethylene adipamide) flake is melted in a steam atmosphere as taught in Waltz U.S.

Patent 2,581,975 and is spun into a 40 total denier 13 filament white yarn at a rate of 1206 yards per minute. The yarn is cold drawn at a draw ratio of 4.11 and scoured according to conventional techniques.

Three samples of knit tubing prepared from the yarn are dyed by immersion for 1 hour at the boil in three aqueous baths (A, B, and C) containing the following, respectively.

Dyebath A:
  10.0% Anthraquinone Green GNN (C.I. Acid Green 25)
  2.0% Sodium lauryl sulfate
  10.0% Ammonium sulfate Dyebath B:
  10.0% Pontamine Fast Red 8BLX (C.I. Direct Red 81)
  2.0% Sodium lauryl sulfate
  10.0% Ammonium sulfate Dyebath C:
  10.0% Anthraquinone Blue SKY (C.I. Acid Blue 78)
  2.0% Sodium lauryl sulfate
  10.0% Ammonium sulfate The bath to fabric ratio is maintained at 50:1. The fabric is then scoured in water containing 2.0% sodium lauryl sulfate for 15 minutes at 75° C., rinsed and dried. The samples are observed to have been dyed a dark green, dark red, and dark blue, respectively.

When a similar tubing of homopolymeric poly(hexamethylene adipamide) yarn is subjected to the same dyeing technique as described above, it acquires only a light shade in each color.

The amount of dye absorbed on the yarn is weighed and expressed as a percentage by weight. The results are summarized in Table I and compared to a poly(hexamethylene adipamide) yarn which does not contain the modifier of this invention (Control I).

TABLE I
[Percent dye on fiber]

| Dye Bath | A | B | C |
|---|---|---|---|
| Sample I | 6.1 | 4.7 | 4.4 |
| Control I | 2.9 | 2.1 | 1.9 |

The heat stability after bleaching of the yarn is tested by bleaching the scoured yarn with the following bleaching agents: peracetic acid (a), sodium chlorite (Textone) (b), and sodium perborate (c).

The $\Delta b$ values (L. G. Glasser and D. J. Troy of the Journal of the Optical Society of America, vol. 42, page 652, 1952) are measured before and after heating. The results are compared in Table II to the corresponding values for a control yarn made from poly(hexamethylene adipamide) containing the prior art modifier N,N'-bis(aminopentyl)piperazine (Control II).

TABLE II
$\Delta b$ Values

| | Sample I | Control II |
|---|---|---|
| No Bleach: | | |
| Before Heating | 1.9 | 3.1 |
| After Heating | 3.9 | 5.7 |
| Bleach (a): | | |
| Before Heating | 1.9 | 0.9 |
| After Heating | 7.3 | 17.0 |
| Bleach (b): | | |
| Before Heating | 3.7 | 2.3 |
| After Heating | 9.7 | 11.6 |
| Bleach (c): | | |
| Before Heating | 2.6 | 3.2 |
| After Heating | 5.0 | 6.5 |

EXAMPLE II

N-cyanobutyl-2,5-dimethylpiperazine is prepared from chlorovaleronitrile and 2,5-dimethylpiperazine following the techniques of Example I. The nitrile is hydrogenated to N-aminopentyl-2,5-dimethylpiperazine following the hydrogenation technique of Example I. The salt of this amine with adipic acid is then formed and it is polymerized with hexamethylene diammonium adipate and spun into yarn in accordance with Example I. The yarn is tested for dyeability and heat stability after bleaching as in Example I and similar improvements are found.

EXAMPLE III

In the N-cyanobutylpiperazine preparation described in Example I, ε-chlorocapronitrile is substituted for chlorovaleronitrile. The product, N-cyanopentylpiperazine, is then hydrolyzed to piperazine-N-caproic acid.

This acid (3.15 parts) is mixed with 178 parts of ε-caprolactam, 12.49 parts of water are then added and the resulting slurry is placed in a nitrogen purged autoclave. The system is closed to the atmosphere and the temperature is raised until an autogenous pressure of 250 pounds per square inch is attained. At this point, the temperature is 190° C. A pressure of 250 p.s.i. is maintained by bleeding off steam while the temperature is slowly raised to 272° C. This temperature is then maintained while the system is bled down to atmospheric pressure. Heating is continued for an additional hour at atmospheric pressure. After extruding and quenching the reaction mass, it is washed by being stirred for 1 hour at about 90° C. in water and thereafter dried in air.

The polymer, prepared as described above, is spun employing the equipment and technique of Example I (but with a spinneret temperature of 272° C.) to produce a 40 denier 13 filament yarn. This yarn, and fabrics produced therefrom, are dyed and bleached in the manner taught in Example I and similar improvements are obtained.

EXAMPLE IV

The piperazine of Example III is replaced with 2,5-dimethylpiperazine. The 2,5-dimethylpiperazine-N-caproic acid, prepared by hydrolysis of the nitrile, is copolymerized with ε-caprolactam and the resulting copolymer is spun into yarn, and thereafter dyed and bleached, all as taught in Example III, and similar improvements are obtained.

EXAMPLE V

Using the apparatus and general technique of Example I in U.S. Patent 2,831,834, at room temperature (25° C.) interfacial polycondensation of poly(hexamethylene adipamide) modified with N-aminoethylpiperazine is carried out as follows:

A 280 cc. per minute stream of a 10% solution of adipyl chloride in benzene is mixed under agitation with a 730 cc. per minute stream of an aqueous solution containing 2.3% by weight of hexamethylenediamine, 0.05% by weight of N-aminoethylpiperazine and 1.7% by weight of sodium hydroxide. The solid modified poly(hexamethylene adipamide) is collected at the outlet at the rate of 140 g. per hour and separated from supernatant liquid by filtration, washed with water and methanol, and dried to yield a solid white polymer.

The polymer is wet-spun into a 30-filament yarn from a 25% solution in formic acid into a 40% solution of sodium hydroxide. The yarn is cold drawn and scoured. The product is a white yarn with good acid-dyeability and improved resistance to bleaching agents.

EXAMPLE VI

Two solutions are prepared as follows: 2.6 grams N-aminoethylpiperazine and 35 grams piperazine hexahydrate and 42.4 grams sodium carbonate are dissolved in 300 ml. of water. Separately, 37.4 grams ethylene glycol bis(chloroformate) is dissolved in 200 ml. of acetone. The two solutions are mixed and agitated for 5 minutes at room temperature. The polymer is collected, washed and dried. Of the resulting polymer, 28.5 grams are obtained as white granules. It has an inherent viscosity (meta-cresol) of 0.71.

This polymer is blended with unmodified homopolymer from piperazine and ethylene glycol bis(chloroformate)

to give, after dry spinning from formic acid, white yarn deeply dyed by acid dyes. In contrast, the unmodified homopolymer is only lightly stained by acid dyes. Fibers from the blend show no more discoloration after bleaching and heating treatments than fibers from the homopolymer.

EXAMPLE VII

Two solutions are prepared as follows: 0.20 grams N-aminopentylpiperazine and 19.2 grams of piperazine hexahydrate and 21.2 grams sodium carbonate are dissolved in 130 ml. of water. Separately, 18.7 grams ethylene glycol bis(chloroformate) is dissolved in 100 ml. of acetone. The two solutions are mixed and agitated for 5 minutes at room temperature. The polymer, which precipitates as white granules, is collected, washed, and dried. The yield is 78%. The inherent viscosity (meta-cresol) is 1.00. An analytical determination shows 70 basic equivalents per million grams.

The polymer is blended with an equal weight of unmodified homopolymer, inherent viscosity 1.5, and dry-spun at 43% solids from formic acid. The yarn is drawn 3.5 times over a pin at 70° C. After bleaching, the yarn is exposed to a temperature of 180° C. for 20 minutes. The yarn is no more discolored than the yarn of Example VI after the same treatment whereas a control yarn of the same polymer modified with N,N'-bis(aminopentyl) piperazine is badly discolored an orange-yellow color.

EXAMPLE VIII

Into a vessel equipped with a high speed mixer is placed 3000 grams piperazine hexahydrate, 158 grams 25% aqueous solution of N-aminoethylpiperazine, 2544 grams sodium carbonate, and 23,000 ml. of water. Mixing is started and a solution of 2244 grams ethylene glycol bis (chloroformate), 3500 ml. tetrahydrofuran, and 2500 ml. methylene chloride is added as rapidly as possible. The finely-divided polymer that forms is collected, washed, and dried. The yield is 2040 grams (85%) polymer having an inherent viscosity of 0.92 (formic acid) and 1.23 (meta-cresol). Basicity is found to be 61 equivalents per million grams.

A blend of similar preparations having the same chemical compositions has an inherent viscosity of 1.35 (meta-cresol) and a basicity of 67. It is dry spun at 41% solids from formic acid from 10 holes of 0.004" diameter into nitrogen heated to 185° C. The fibers are drawn 3–6 times at 50 to 75° C. The fibers exhibit excellent deep dyeings with acid dyes which are surprisingly highly stable to ultra-violet light, e.g., C.I. Acid Green 25 when applied to the fiber gives no color break after 400 hours' exposure in an Atlas Fade-Ometer.

EXAMPLE IX

In a high speed blendor is placed a solution of 19.2 grams piperazine hexahydrate, 0.27 gram N-aminoethylpiperazine, 21.2 grams sodium carbonate, and 150 ml. of water. To this is added a solution of 16.85 grams ethylene glycol bis(chloroformate), 2.05 grams isophthaloyl chloride, and 100 ml. acetone. After collecting, washing, and drying, there is obtained a polyamide-urethane as white, finely-divided particles in 78% yield. Inherent viscosity is 1.15 (meta-cresol). Basicity is found to be 99 equivalents per million grams. The polymer is press-melt spun at 225° C. at 900 p.s.i. through a 0.009"-hole and would up at 100 y.p.m. to give a tough, cold drawable fiber.

EXAMPLE X

A charge of 688 parts of anhydrous piperazine, 470 parts of chlorovaleronitrile, 467 parts of sodium carbonate, 1,760 parts of xylene, and 4 parts potassium iodide, as catalyst are heated at reflux with stirring for 2 hours. The reaction mixture is permitted to cool, and the solids are removed by suction filtration. The xylene and the excess piperazine are removed by distillation at atmospheric pressure under nitrogen, and the residue is distilled under vacuum to produce a total of 346 parts of liquid N-cyanobutylpiperazine having a boiling point between 130° and 135° C. at a pressure of from 1 to 1.3 mm.

The N-cyanobutylpiperazine, in an amount of 346 parts is hydrogenated at 130° C. and 1600 pounds per square inch for 9 hours over 50 parts of Raney cobalt catalyst in the presence of 206 parts of methanol and 398 parts ammonia. The mixture is filtered to remove catalyst, and the solvent is removed from the filtrate by distillation under reduced pressure at 100° C. The residue is fractionally distilled in vacuum to give a constant boiling liquid, N-aminopentylpiperazine, 275 parts, (B.P. 105–7° C./0.75–1 mm.).

This N-aminopentylpiperazine, and nonanedioic acid are added under nitrogen in a reaction tube to the salt of bis-(para-aminocyclohexyl)methane and decanedioic acid. A suitable method for preparing salt is taught in U.S. Patent 2,512,606 to provide a copolymer containing 10% by weight of the aminopentylpiperazine modifier. This copolymer is melted in a steam atmosphere as taught in U.S. Patent 2,51,975 and is spun into a yarn. The yarn is drawn and then is dyed in an aqueous bath for one hour at the boil with an infinite dye bath. The dye bath contains 5% C.I. Acid Green 25
0.5% Sodium lauryl sulfate
4% Acetic acid This dyed yarn is rinsed and dried and then found to have 1.65% C.I. Acid Green 25 dye on fiber. A control yarn spun from unmodified polymer is prepared, and then dyed as above. This control yarn has only 0.18% C.I. Acid Green 25 dye on fiber. This example shows that a polymer modified by a divalent radical of the formula

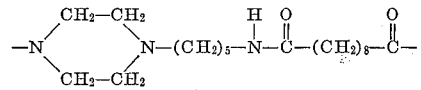

is about 9 times as acid-dye sensitive as is the unmodified polymer. When nonanedioic acid is substituted for decanedioic acid in this example to form a modified copolymer 11.2 mole percent), the yarn picks up 2.96% of the dye from an infinite bath versus only 0.07% by the unmodified control. Similarly useful yarn is formed substituting hexadecanedioic acid.

EXAMPLE XI 34 parts of the N-aminopentylpiperazine, as provided in Example X, about 29 parts of adipic acid, and 20 parts of water are added under nitrogen to about 1090 parts of caprolactam in a reaction tube. This tube is evacuated to 1 mm., sealed, and then heated for 6 hours at 250° C. Then the seal is broken and the tube is heated for 2 hours more at 250° C. and under nitrogen to provide a copolymer (relative viscosity 31.3) containing about 2% by moles of the modifying unit. The copolymer is flaked, and spun from a melt in a steam atmosphere, as taught in U.S. Patent 2,571,975, into a 184 total denier 5 filament yarn. The yarn is drawn at a draw ratio of 5 and then is dyed in a manner similar to the yarn of Example X. The test yarn has 3.37% dye on fiber while a similar control yarn (spun from polycaproamide as a 131 total denier yarn and dyed as is the 184 denier yarn) has only 2.68% dye on fabric. This example shows that a yarn from a copolymer of 6 nylon modified by a divalent radical of the formula

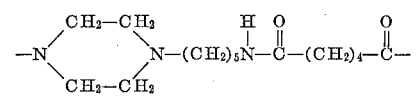

is significantly more acid-dye sensitive than is a yarn from unmodified 6 nylon.

The composition of the present invention is produced by utilizing a compound of the formula

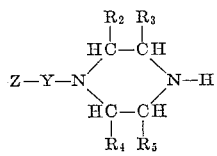

wherein Z is a member of the class —COOR₁ and

—NH—R₁ and —OH, in copolymerization into a polycarbonamide or a polyurethane.

Suitable and representative modifiers include N-aminoalkylpiperazines such as N-aminoethylpiperazine, N-aminopropylpiperazine, N - aminobutylpiperazine, N - aminopentylpiperazine, N - aminohexylpiperazine, N - N-aminocyclohexylpiperazine, etc.; their carbon-substituted derivatives such as N-aminobutyl-3-methylpiperazine, N - aminopentyl - 2,5 - dimethylpiperazine, N-aminopropyl - 2,3,5,6 - tetramethylpiperazine, N - 2'-methylaminopropyl - 2,5 - dimethylpiperazine, N - 2',2'-dimethylaminopropylpiperazine, N - 2',5' - dimethyl - 4'-aminocyclohexylpiperazine; their primary amino monoalkylated derivatives such a N-methyliminoethylpiperazine; the corresponding N-hydroxyalkylpiperazines such as N-hydroxyethylpiperazine; and the corresponding N-carboxyalkylpiperazines such as piperazine-N-caproic acid and 2,5-dimethylpiperazine-N-caproic acid.

When the polymer-forming reaction mixture consists essentially of a polyamide-forming diacid and diamine, the preferred amount of modifier is between about 1.0 and about 15 mole percent. When the polymer-forming reaction mixture is an amino acid or lactam, the preferred amount of modifier is between about 0.5 and about 7.5 mole percent. When the polymer-forming reaction mixture consists essentially of a polyurethane-forming mixture, the preferred amount of modifier is between about 0.5 and about 1.5 mole percent. In any case, the amount of modifier is chosen so as to confer from about 20 to about 300 equivalents of basicity per million grams of sample as determined by a potentiometric titration on a polymer sample.

In the melt polymerization of polyamides, the modifiers are preferably added prior to the polymerization or during the early stages. Suitable polyamidation processes are disclosed in U.S. Patents 2,071,250; 2,071,253; 2,130,948 and 2,163,636. When Z is —COOR₁, the modifier may be added directly to the polymerization mixture prior to the polymerization. For example, when the modifier is piperazine-N-caproic acid or 2,5-dimethylpiperazine-N-caproic acid, it may be added to a polymerization mixture, such as an aqueous solution of hexamethylene diammonium adipate or an aqueous solution of ε-aminocaproic acid or molten ε-caprolactam. When Z is

—NHR₁ it is preferred to form a salt of the modifier with a polyamide-forming reactant containing a carboxyl group and add this salt to the polyamide-forming reactants. For example, when N-5'-aminopentylpiperazine is used as the modifier, it is preferred to add an equivalent amount of adipic acid to form the salt and then to add the salt to a polymerization mixture, such as an aqueous solution of hexamethylene diammonium adipate or an aqueous solution of ε-aminocaproic acid or molten ε-caprolactam.

While melt copolyamidation is usually preferred, interfacial polyamidation techniques may also be employed. Interfacial polyamidation has the advantage that it can be conducted at lower temperature and, consequently, it gives greater freedom in the choice of modifiers to be employed. By an "interfacial" polymerization is meant a process whereby the diamine in one liquid phase and the acid chloride in a second liquid phase immiscible with the first phase, are mixed, at least one of the phases including a liquid diluent, the admixture being maintained until the condensation polymerization has occurred to the extent desired. This process is described in detail in U.S. Patent 2,831,834.

Shaped articles prepared from the polymer of the present invention exhibit a high sensitivity to acid dyes and acid-dyed textiles produced therefrom show good washfastness. Suitable acid dyes include the sodium bisulphite salt of para-sulfobenzene-azo-beta-naphthol (C.I. 152), the toluene-para-sulphonyl esters (C.I. 430), the sodium salt of toluene-para-sulphonyl-ether of 4-para-hydroxybenzene-azo-1-para-chloro-orthosulpho-phenyl - 3-methyl-5-hydroxy-pyrazol (C.I. 642), the sulphonic acids of dialkylaminophenylaminophenyl-naphthophenazonium chloride (C.I. 833) and the sodium salt of 1:4-di-ortho-sulpho-para-tolyl-aminoanthraquinone (C.I. 1078). These dyes are applied by conventional techniques.

The shaped articles prepared from the polymers of the present invention exhibit an improved stability to the action of bleaching agents, both per se or in combination with or followed by action of heat or light. Bleaching agents which may be used include: peracetic acid, sodium chlorite sold under the trademark of "Textone," a mixture of KHSO₅, KHSO₄, and K₂SO₄ in mole proportions 2:1:1 sold under the trademark of "Oxone," and sodium perborate.

Polycarbonamide-forming reactants include diamine of the formula NH₂—A—NH₂ and dicarboxylic acids of the formula HOOC—A'—COOH and amino carboxylic acids of the formula HOOC—A''—NH₂, in which A, A', and A'' are divalent hydrocarbon radicals free from aliphatic unsaturation. Some useful reactants within this group are those in which A is (CH₂)ₓ, A' is (CH₂)ᵧ and A'' is (CH₂)_z where $x$ is at least 4, $y$ is at least 3 and $z$ is at least 5. It is to be understood that the term "polycarbonamide" includes a polyamide formed from a diamine and carbonic acid, i.e., a polyurea. Mixtures of various diamines, diacids, etc., may also be employed. Particularly useful are hexamethylene-diamine and adipic acid, the polyamide-forming derivative thereof, ε-aminocaproic acid and the polyamide-forming derivative thereof, including ε-caprolactam.

In the formation of copolycarbonamides by melt polymerization, the reactants may be heated together with suitable means employed to remove water formed in the reaction. The diamine is employed in substantially equimolar proportions to the total dibasic acid present during the reaction. The copolymeric products may be formed directly from the corresponding monomers or one homopolymer may be added to polymerizable coreactants, distribution of the desired units entering the products via amide interchange. Formation of the desired diamine salts of the various dibasic acids prior to melt polymerization assists in control of the reaction. The conventional polyamide melt polymerization cycle is suitable. Catalytic materials, viscosity stabilizers, pigments, and the like may also be present.

The melt polymerization is conducted under conditions to prevent oxidation, that is, the presence of oxygen should be avoided and a slow stream of an inert gas, such as nitrogen or hydrogen, is advantageously passed through and/or over the molten mass. During the polymerization, the melting point and the viscosity of the melt gradually increase. The temperature is maintained high enough to keep the mass in the molten state during this heating period. Heating is continued with removal of water of reaction at least until a filament is formed when a rod is touched to the melt and thereafter drawn away. The polymer is conveniently removed from the reaction vessel in molten form, and subsequently cooled. The extruded material is then formed into blocks, chips, and the like, suitable for feed to melt spinning equipment.

Another class of polymers which may be modified in accordance with this invention are the polyurethanes, including polythiourethanes. They have the repeating unit

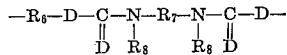

wherein $R_7$ and $R_6$ are divalent organic radicals and $R_8$ is lower alkyl or hydrogen. D is oxygen or sulfur. These polymers may be formed by reacting a compound of the general formula

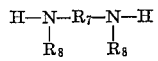

with a compound of the general formula

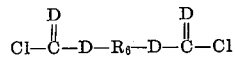

or by reacting a compound of the general formula $$D{=}C{=}N{-}R_7{-}N{=}C{=}D$$

with a compound of the general formula

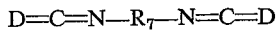

Suitable diisocyanates and diisothiocyanates as well as suitable diols, dihydric phenols and dithiols include those listed in U.S. Patent 2,284,637. Suitable processes for forming the polyurethanes and polythiourethanes from these reactants include the interfacial polymerization illustrated in U.S. Patent 2,284,637. Also suitable is a modified interfacial polymerization wherein the organic solvent is miscible with water, as illustrated in Examples VI and VII.

The copolymer may be shaped into articles such as filaments and films. It may be spun into filamentary form by conventional spinning techniques, such as melt-spinning, dry-spinning or wet-spinning. The spinning may be followed by drawing to several times the spun length to produce molecularly oriented structures. The yarns produced in accordance with the present invention are suitable for the usual textile applications. They may be employed in the knitting or weaving of fabrics of all types as well as in the production of non-woven, felt-like products produced by known methods.

Films may be melt-cast from the polymers of this invention, for example, by the process described in U.S. Patent 2,364,435.

Many equivalent modifications of the above will be apparent to those skilled in the art from a reading of the above, without departing from the inventive concepts.

What is claimed is:

1. A composition of matter comprising a linear, synthetic, fiber-forming polymer selected from the group consisting of polycarbonamides and polyurethanes containing as an integral part of the main polymer chain between about 0.2 and about 15.0 mole percent of recurring units of the formula

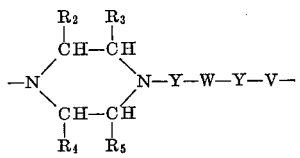

wherein —Y— is alkylene containing no more than 16 carbon atoms, —W— is selected from the group consisting of

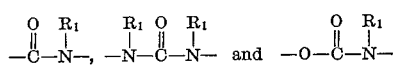

—V— is selected from the group consisting of

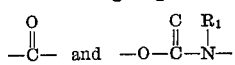

with the proviso that —V— be joined to —Y— in such a manner that

terminates the formula of the repeating unit, and $R_1$, $R_2$, $R_3$, $R_4$ and $R_5$ are selected from the group consisting of hydrogen and alkyl containing no more than about four carbon atoms.

2. A linear, synthetic, fiber-forming polycarbonamide of claim 1 wherein the recurring units are of the formula

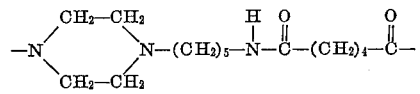

3. The copolymer of claim 2 wherein the said polycarbonamide is polyhexamethylene adipamide.

4. The copolymer of claim 2 wherein the said polycarbonamide is polycaproamide.

5. A linear, synthetic, fiber-forming polycarbonamide of claim 1 wherein the recurring units are of the formula

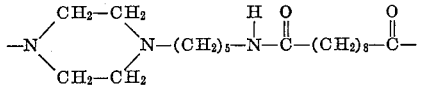

6. The copolymer of claim 5 wherein the said polycarbonamide is the polyamide of bis-(para-aminocyclohexyl) methane and decanedioic acid.

7. A linear, synthetic, fiber-forming polycarbonamide of claim 1 wherein the recurring units are of the formula

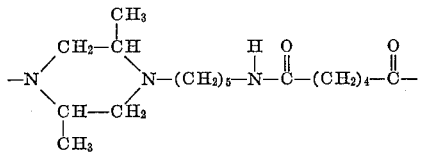

8. The copolymer of claim 7 wherein the said polycarbonamide is polyhexamethylene adipamide.

9. A linear, synthetic, fiber-forming polycarbonamide of claim 1 wherein the recurring units are of the formula

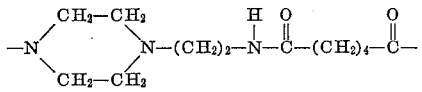

10. The copolymer of claim 9 wherein the said polycarbonamide is polyhexamethylene adipamide.

11. A linear, synthetic, fiber-forming polyurethane of claim 1 wherein the recurring units are of the formula

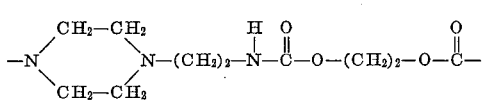

12. The copolymer of claim 11 wherein the said polyurethane consists of repeating units of the formula

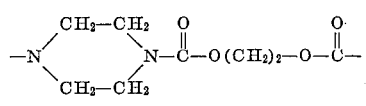

13. A linear, synthetic, fiber-forming polyurethane of claim 1 wherein the recurring units are of the formula

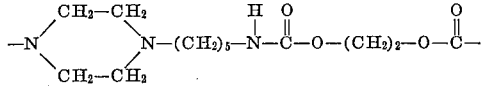

14. The copolymer of claim 13 wherein the said polyurethane consists of repeating units of the formula

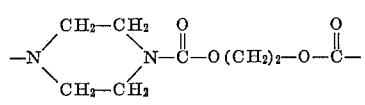

15. A linear, synthetic, fiber-forming polycarbonamide of claim 1 wherein the recurring units are of the formula

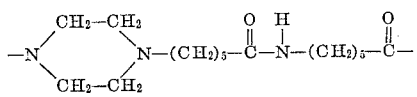

16. A linear, synthetic, fiber-forming polycarbonamide of claim 1 wherein the recurring units are of the formula

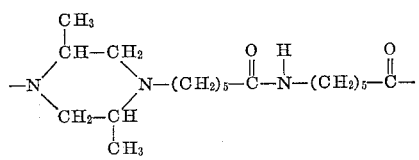

17. A copolymer of a linear, synthetic, fiber-forming polyurethane consisting essentially of recurring units of the formula

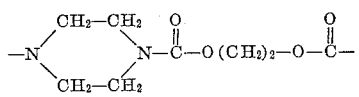

having present as an integral part of the polymer chain and in a minor proportion recurring units of the formulae

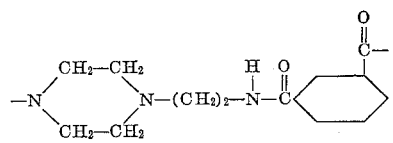

and

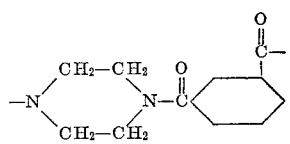

the hexagon representing phenylene, and wherein copolymeric units, constituting between about 0.2 and about 15.0 mole percent and constituting an integral part of the polymer chain, consist essentially of recurring units of the formula

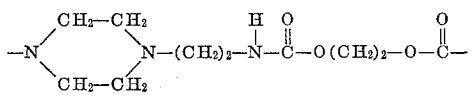

References Cited

UNITED STATES PATENTS

| | | | |
|---|---|---|---|
| 2,274,831 | 3/1942 | Hill | 260—78 |
| 2,731,445 | 1/1956 | Whittbecker | 260—77.5 |
| 2,731,446 | 1/1956 | Whittbecker | 260—77.5 |
| 2,852,492 | 9/1958 | William et al. | 260—78 |
| 2,855,267 | 10/1958 | Zimmerman | 8—115.5 |
| 2,859,216 | 11/1958 | Pattison | 260—78 |
| 2,904,536 | 9/1959 | Reith | 260—78 |
| 2,913,433 | 11/1959 | Whittbecker | 260—77.5 |
| 2,915,505 | 12/1959 | Koontz et al. | 260—77.5 |
| 2,929,801 | 3/1960 | Kooler | 260—77.5 |
| 2,952,667 | 9/1960 | Cardwell | 260—78 |
| 2,970,987 | 2/1961 | Whittbecker | 260—77.5 |
| 3,168,496 | 2/1965 | McGillivray et al. | 260—77.5 |

OTHER REFERENCES

Van Alphen: Rec. Trav. Chem., vol. 56, pp. 1007–1010 (1937).

Hamilton et al.: "Modern Plastics," April 1959, vol. 36, No. 8, pages 150, 152, 154, 156, and 206.

DONALD E. CZAJA, *Primary Examiner.*

F. McKELVEY, *Assistant Examiner.*

UNITED STATES PATENT OFFICE
CERTIFICATE OF CORRECTION

Patent No. 3,370,044                              February 20, 1968

Ralph Gardner Beaman

It is hereby certified that error appears in the above numbered patent requiring correction and that the said Letters Patent should read as corrected below.

Column 9, lines 70 to 73, the formulae should appear as shown below instead of as in the patent:

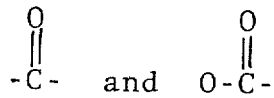

Signed and sealed this 29th day of April 1969.

(SEAL)
Attest:

Edward M. Fletcher, Jr.                                     EDWARD J. BRENNER

Attesting Officer                                           Commissioner of Patents